(12) United States Patent
Orban et al.

(10) Patent No.: US 10,550,640 B2
(45) Date of Patent: Feb. 4, 2020

(54) INTELLIGENT TOP DRIVE FOR DRILLING RIGS

(71) Applicant: Schlumberger Technology Corporation, Sugar Land, TX (US)

(72) Inventors: Jacques Orban, Katy, TX (US);
Shunfeng Zheng, Katy, TX (US);
Gokturk Tunc, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 369 days.

(21) Appl. No.: 14/939,178

(22) Filed: Nov. 12, 2015

(65) Prior Publication Data
US 2016/0290046 A1 Oct. 6, 2016

Related U.S. Application Data

(60) Provisional application No. 62/140,790, filed on Mar. 31, 2015.

(51) Int. Cl.
*E21B 3/02* (2006.01)
*E21B 44/04* (2006.01)
*E21B 19/16* (2006.01)
*E21B 47/00* (2012.01)
*G01L 5/00* (2006.01)

(52) U.S. Cl.
CPC .............. *E21B 3/02* (2013.01); *E21B 19/166* (2013.01); *E21B 44/04* (2013.01); *E21B 47/0006* (2013.01); *G01L 5/00* (2013.01)

(58) Field of Classification Search
CPC ........ E21B 3/02; E21B 19/161; E21B 19/165; E21B 44/04
See application file for complete search history.

(56) References Cited

U.S. PATENT DOCUMENTS

| 5,246,076 A * | 9/1993 | Watson ................. E21B 43/127 166/105 |
| 7,140,445 B2 * | 11/2006 | Shahin ...................... E21B 7/20 166/380 |
| 7,493,970 B1 | 2/2009 | McKnight, Jr. et al. |
| 8,281,877 B2 * | 10/2012 | Shahin ...................... E21B 7/20 166/77.52 |
| 9,074,455 B2 * | 7/2015 | Pilgrim ................... E21B 21/01 |
| 2007/0017682 A1 | 1/2007 | Abrahamsen et al. |
| 2010/0065336 A1 | 3/2010 | Wells et al. |
| 2010/0199812 A1 * | 8/2010 | Richardson ........... E21B 19/164 81/57.11 |
| 2010/0214121 A1 | 8/2010 | Puro et al. |
| 2011/0253455 A1 * | 10/2011 | Williams .................. E21B 3/02 175/202 |
| 2011/0297445 A1 | 12/2011 | Clemens |
| 2013/0025937 A1 * | 1/2013 | Pilgrim ................... E21B 21/01 175/24 |

(Continued)

*Primary Examiner* — Frederick L Lagman
(74) *Attorney, Agent, or Firm* — Rachel E. Greene (57) ABSTRACT

A top-drive system and a drilling rig. The top-drive system includes a sheave configured to receive a drilling line, a frame coupled with the sheave and configured to transmit a weight of a tubular string suspended therefrom to the sheave, a controller, and a sensor in communication with the controller. The sensor is configured to directly measure one or more physical parameters of a drilling operation and provide data representing the one or more physical parameters to the controller.

8 Claims, 7 Drawing Sheets

(56) References Cited

U.S. PATENT DOCUMENTS

| | | | | |
|---|---|---|---|---|
| 2013/0098632 A1* | 4/2013 | Wetzel | ............... | E21B 43/128 |
| | | | | 166/373 |
| 2013/0341059 A1* | 12/2013 | Flusche | ............... | E21B 7/023 |
| | | | | 173/185 |
| 2013/0341089 A1* | 12/2013 | Flusche | ............... | E21B 19/20 |
| | | | | 175/24 |
| 2013/0343836 A1* | 12/2013 | Flusche | ............... | B23P 11/00 |
| | | | | 414/22.55 |
| 2014/0124218 A1* | 5/2014 | Pilgrim | ............... | E21B 44/02 |
| | | | | 166/380 |
| 2016/0060982 A1* | 3/2016 | Layden | ............... | E21B 19/16 |
| | | | | 166/380 |
| 2016/0298441 A1* | 10/2016 | Orban | ............... | E21B 33/072 |

* cited by examiner

INTELLIGENT TOP DRIVE FOR DRILLING RIGS

CROSS-REFERENCE TO RELATED APPLICATIONS

This application claims priority to U.S. Provisional application having Ser. No. 62/140,790, which was filed on Mar. 31, 2015. This priority provisional application is incorporated herein by reference in its entirety.

BACKGROUND

Top drives are used to suspend and rotate a string of drill pipe and/or casing in drilling applications. The top drive is supported by a drilling line wrapped on a set of sheaves and connected to drawworks at one extremity. The top drive supports the drill string via a thrust bearing. Mud may be pumped into the drill string via a swivel. Furthermore, the top drive generally includes one or more motors (electric or hydraulic) which generate(s) the rotation of the drill string. The reaction torque applied to the top drive may be transmitted to the mast via a set of rollers attached to the top-drive chassis.

Various measurements may be used to manage the drilling process, including those that involve the top drive. Hook load and hook elevation above the rig floor are two examples of such measurements. These measurements may be employed to calculate drilling parameters such as weight on bit (WOB), rate of penetration (ROP), and depth. A variety of other types of measurements are used to calculate these and other drilling parameters.

In many applications, sensors that take measurements such as these are distributed on the drilling rig, and the measurements taken may be indirect. Accordingly, non-linearities, reduced resolution, noise, etc. may be part of the measurement system and may or may not be corrected in the measurements. For example, hook load is generally measured on the "dead-line" of the drilling line, near or on the anchor below the rig floor. Generally, there is no correction for friction in the sheaves in this measurement. In addition, the weight of the travelling block, hook and top drive may limit the resolution of the hook-load measurement.

One way this is handled is by installing measurement and communication devices on top of the drill string. These devices thus rotate with the drill string. When such devices are installed, communication between these systems attached to (and rotating with) the drill string to the rig system may be performed either by rotary transformer (inductive coupling), or sliding contacts or e-mag communication (such as WIFI). The main node is thus at the rig, resulting in long communication paths form the rotating devices with risk of signal corruption.

SUMMARY

Embodiments of the disclosure may provide a top-drive system and a drilling rig. The top drive system includes a sheave configured to receive a drilling line, a frame coupled with the sheave and configured to transmit a weight of a tubular string suspended therefrom to the sheave, a controller positioned within or on the frame, and a sensor positioned within or on the frame and in communication with the controller. The sensor is configured to directly measure one or more physical parameters of a drilling operation and provide data representing the one or more physical parameters to the controller.

Embodiments of the disclosure may also provide a drilling rig including a rig control system configured to calculate drilling parameters, and a top drive configured to be controlled by the rig control system according to the drilling parameters. The top drive includes a sheave configured to receive a drilling line, a frame coupled with the sheave and configured to transmit a weight of a tubular string suspended therefrom to the sheave, a controller disposed in or on the frame and in communication with the rig control system, and a sensor disposed within or on the frame and in communication with the controller, wherein the sensor is configured to directly measure one or more physical parameters of a drilling operation and provide data representing the one or more physical parameters to the controller.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

In general, embodiments of the present disclosure may provide a top-drive system, which may take measurements and/or process measurement data within the top-drive. Various different types of sensors will be described below, which may be implemented within or near the frame of the top drive. Further, the sensors may communicate with a controller, which may also be disposed within or near the frame. The sensors may acquire the measurement data and provide the data to the controller, which may, in turn, process and/or communicate the data with a rig control system that is remote or otherwise external to the top-drive system.

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
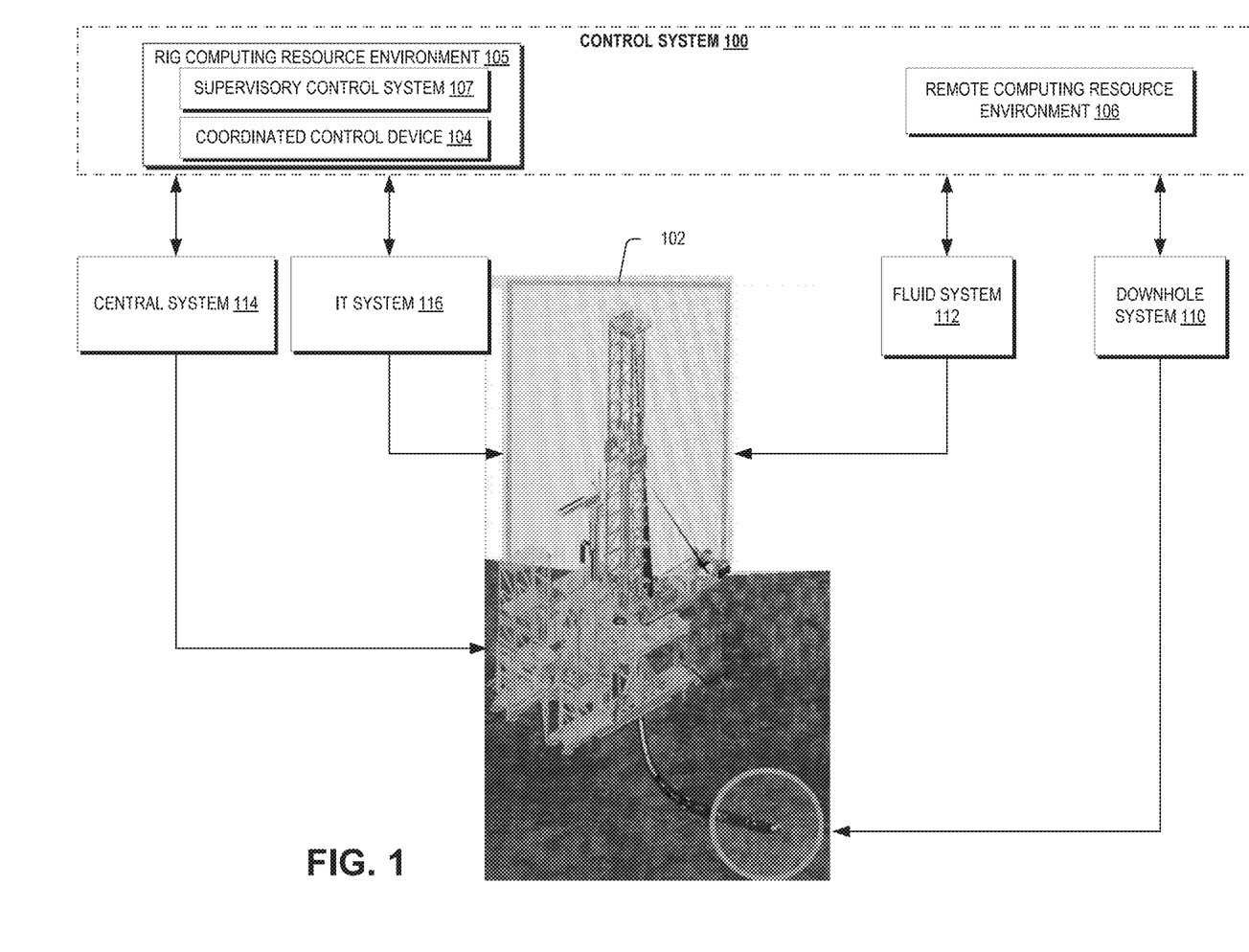
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 2:
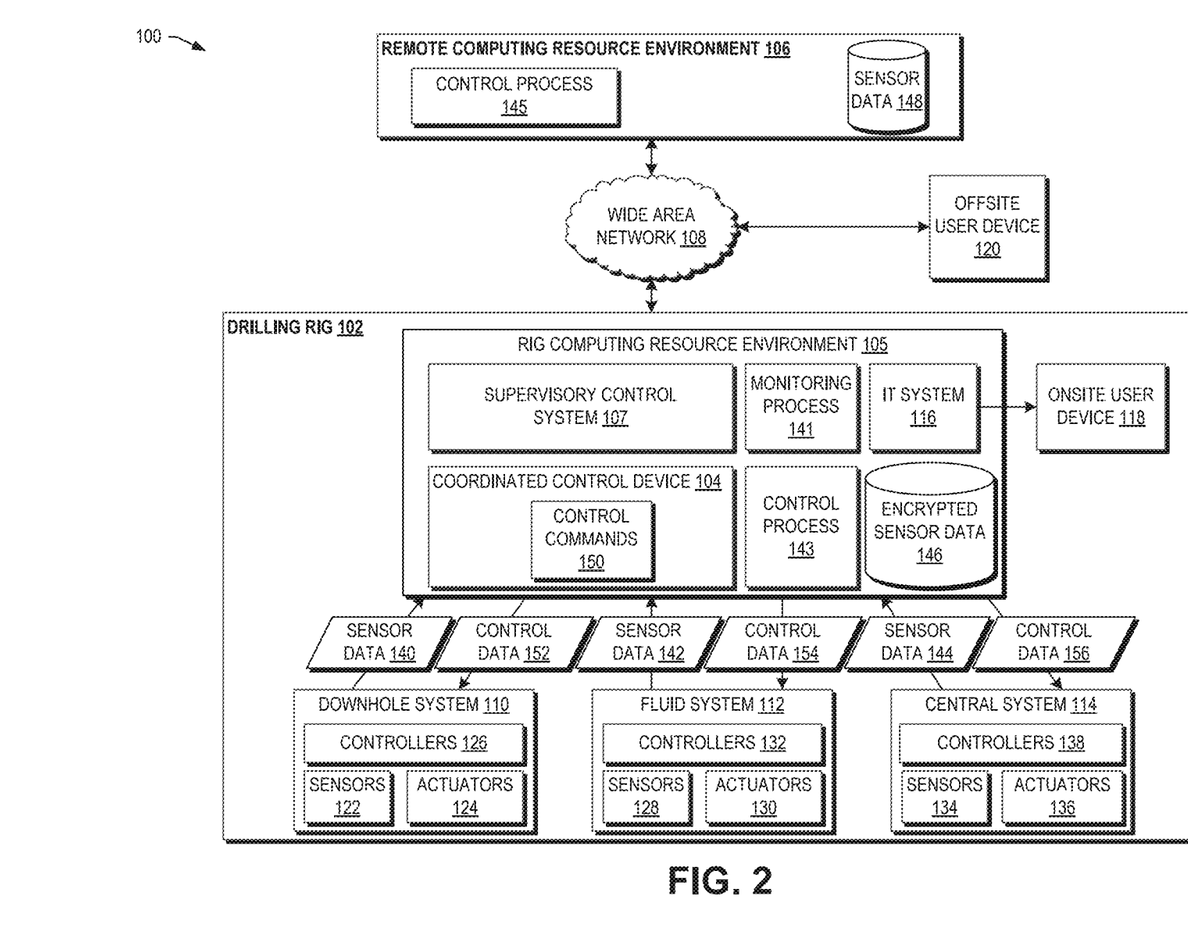
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration.

In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
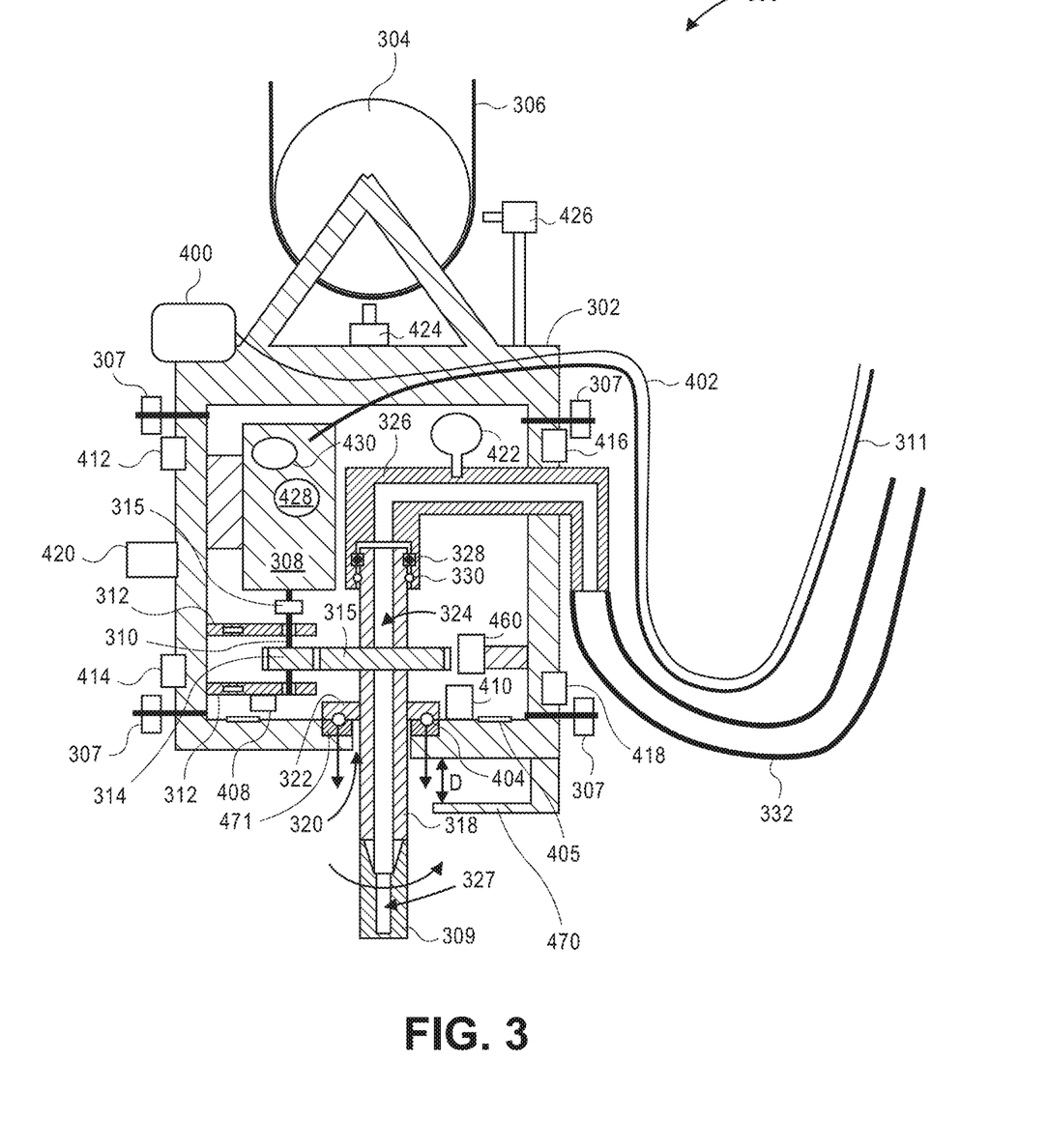
FIG. 3 illustrates a conceptual, side, schematic view of a top-drive system, according to an embodiment.

FIG. 3 illustrates a conceptual, side, schematic view of a top-drive system 300, according to an embodiment. The top-drive system 300 may generally include a frame 302 attached to one or more sheaves 304. The sheave 304 is in turn connected to a drilling line 306, which may be attached to a travelling block, for raising and lowering the frame 302. The frame 302 is also connected to one or more torque reaction rollers 307, which may rotate on pathways (e.g., rails) of a mast.

Several mechanical components are mounted or otherwise positioned within the frame 302. These components may generally provide for the support of a drill string 309 and well as rotation thereof. It will be appreciated that, although the present description refers to a drill string 309, any type tubular string may be suspended from the frame 302. In the illustrated example, the top-drive system 300 includes a motor 308 and a rotatable motor shaft 310 that is driven by the motor 308. The motor 308 may be hydraulic or electric, or powered in any other way; moreover, multiple motors 308 may be provided. In the illustrated embodiment, the motor 308 may receive electric current from an external power source (e.g., a generator with its controller) via a power cable 311. In an embodiment, the motor 308 may be a three-phase induction electrical motor, and the controller may be a VFD (variable frequency drive).

In the illustrated embodiment, the shaft 310 driven by the motor 308 extends through and may be supported radially by two gear supports 312. The shaft 310 may be connected with a first gear 314, e.g., at a location vertically between the gear supports 312. For example, the motor shaft 310 may be coupled with the first gear 314 via a shaft coupling 315. The shaft coupling 315 may transmit torque from the motor shaft 310 to the first gear 314, while allowing for radial displacement of the motor shaft 310 due to the bending of the either or both of the gear supports 312. Although two gear supports 312 are shown, it will be appreciated that any number may be employed.

The first gear 314 may be a small gear, and may engage a larger, second gear 316. The second gear 316 may be coupled with a top-drive shaft 318, which may be connected with the drill string 309, such that rotation of the top-drive shaft 318 causes rotation of the drill string 309. In some embodiment, multiple gear reductions may be used between the shaft 310 driven by the motor and the shaft 318.

The top-drive shaft 318 may be received through an opening 320 in the bottom of the frame 302, and may be supported against the bottom of the frame 302 using a thrust bearing 322. Thus, the hook load, that is, the weight of the drill string 309, may be transmitted via the top-drive shaft 318 to the frame 302 via the thrust bearing 322.

The top-drive shaft 318 may be generally hollow, and may provide a conduit 324 therethrough, which may communicate with an inner diameter 327 of the drill string 309. Further, the top-drive shaft 318 may be coupled at its upper side to a downstream side of a mud conduit 326. The top-drive shaft 318 may rotate relative to the mud conduit 326 during drilling, and thus the mud conduit 324 and the top-drive shaft 318 may be provided with one or more seals 328 and/or one or more bearings 330 to maintain a sealed, rotatable coupling therebetween.

The mud conduit 326 may, in some embodiments, extend outside of the frame 302 and may be connected at an upstream side with a mud hose 332. Accordingly, during certain drilling operations, drilling mud may be delivered via the mud hose 332, through the mud conduit 326, through the conduit 324 in the top-drive shaft 318, and into the drill string 309.

The top-drive system 300 may include a programmable logic controller (PLC) 400, which may serve as the acquisition node on the top-drive system 300. The PLC 400 may be or include any suitable type of processor, microprocessor, combinations thereof, and/or the like, and may include any hardware to support its functionality, as will be described herein. The PLC 400 may be mounted within or on the outside of the frame 302.

The PLC 400 may receive electrical current via a cable 402 and may communicate with the rig acquisition system via the cable 402 or wirelessly (e.g., using WIFI, radio signals, etc.) according to any suitable transmission protocol. In turn, the rig acquisition system may be configured specifically for data acquisition or may be integrated into other systems, such as mud-logging systems, driller computers, etc. In some other embodiments, a battery within, on, or proximal to the PLC 400 may be provided and connected with the PLC 400 so as to provide power thereto. The battery may be the sole power source for the PLC 400 or may be an auxiliary or back-up system.

The PLC 400 may also be electrically connected with the sensors provided as part of the top-drive system 300, as will be described below. In some embodiments, the PLC 400 may be mounted in a specific box, which may protect the cables and/or connections therein, allowing operation in hazardous conditions.

In some embodiments, the PLC 400 may include or be coupled with a local memory system. The memory is "local" in the sense that it is installed proximal to the PLC 400, e.g., on or within the top drive. The memory system may be writable by operation of the PLC 400, allowing the PLC to record at least some of the collected sensor data. Thus, the memory system may provide a temporary buffer, e.g. in embodiments in which the PLC 400 is capable of recording measurements at a rate that is faster than the PLC 400 is able to transmit these measurements to the rig acquisition system, or when raw data is to be compressed prior to transmission.

Further, the local recording in the local memory may act as "black-box" recorder for maintenance parameters of the top-drive. For example, raw data for vibration inside rotating motor may be stored during system operation and retrieved during maintenance to determine the proper and optimized maintenance on the device. The local memory may also be used as temporary storage of data (either raw data or locally-processed data) when the communication network is temporarily not in action; this situation may exist when a problem occurs on the PLC communication cable (e.g., cable 402) or when the rig acquisition system is temporally not available (such as during re-boot or power failure at rig system). When using e-mag communication (e.g., radio or WIFI), there may be a period when this communication method is not available due to e-mag interference (e.g., noise from the motor) or when prohibited (e.g., when loading explosives on the rig floor).

The top-drive system 300 may also include several sensors. In general, the sensors may monitor rig activities related to well operations (such as drilling or casing-cementing operations) or for rig maintenance. The sensors may take direct measurements and may communicate the measurements directly to the PLC 400, which may promote rapid, robust data acquisition.

For example, the top-drive system 300 may include one or more hook-load sensors 405, 471. The hook-load sensor 405 may measure strain on the frame 302, e.g., deformation induced by bending of the frame 302. Although illustrated as measuring the strain on the bottom of the frame 302, it will be appreciated that the strain (and thus hook load) may additionally or instead be measured on the sidewalls of the frame 302. Further, the hook-load measurement may include a "micro-displacement" sensor such as linear variable differential transducer (LVDT), eddy current sensor, and/or the like, which may measure the distance D between the frame 302 and another, unloaded part of the frame 302, e.g., structure 470. In an embodiment, the hook-load sensor 471 may be or include a load cell 471 positioned between the fixed cage of the thrust bearing 322 supporting the rollers or balls 404 of the bearing 322 and the frame 302.

The top-drive system 300 may further include a sensor 410, which may be or include an accelerometer, attached to the frame 302 in the vicinity of the thrust bearing 322. The sensor 410 may provide information for a characterization of the axial vibration (and resonance) present in the tubular (e.g., the drill string 309) hanging on the top-drive system 300. While drilling, this may be used to determine axial vibration in the drill string 309 that may be present downhole, at the bit, and may be considered a bit-bouncing effect. Other axial resonance may also be recognized with this sensor 410.

Figure 6:
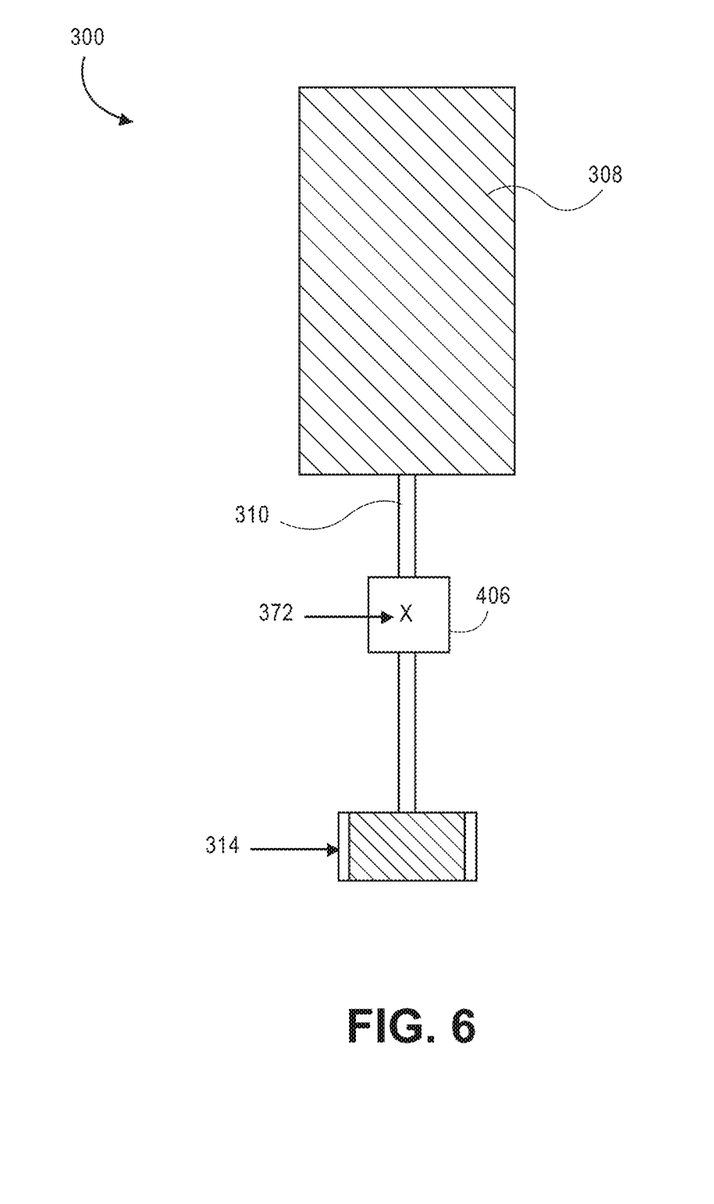
FIG. 6 illustrates a conceptual, schematic view of the top-drive system, according to an embodiment.

Turning to FIG. 6, there is illustrated a partial, conceptual, schematic view of the top drive system 300, showing one or more torque sensors 406 thereof. Torque transmitted by the top-drive system 300 onto the drill string 309 may be directly measured by the torsion of the motor shaft 310 as it rotates the first gear 314. Such sensors 406 may include a strain gauge bridge 372 on the motor shaft 310 (e.g., mounted at 45 degree angle from the shaft axis), allowing the measurement of the principal stresses due to twisting of the shaft 310 due to torque. The signal from the stain gauge bridge (rotating with the shaft 310) of the torque sensors 406 may be transmitted to the PLC 400 via an induction coupling or a brush coupling.

Figure 4:
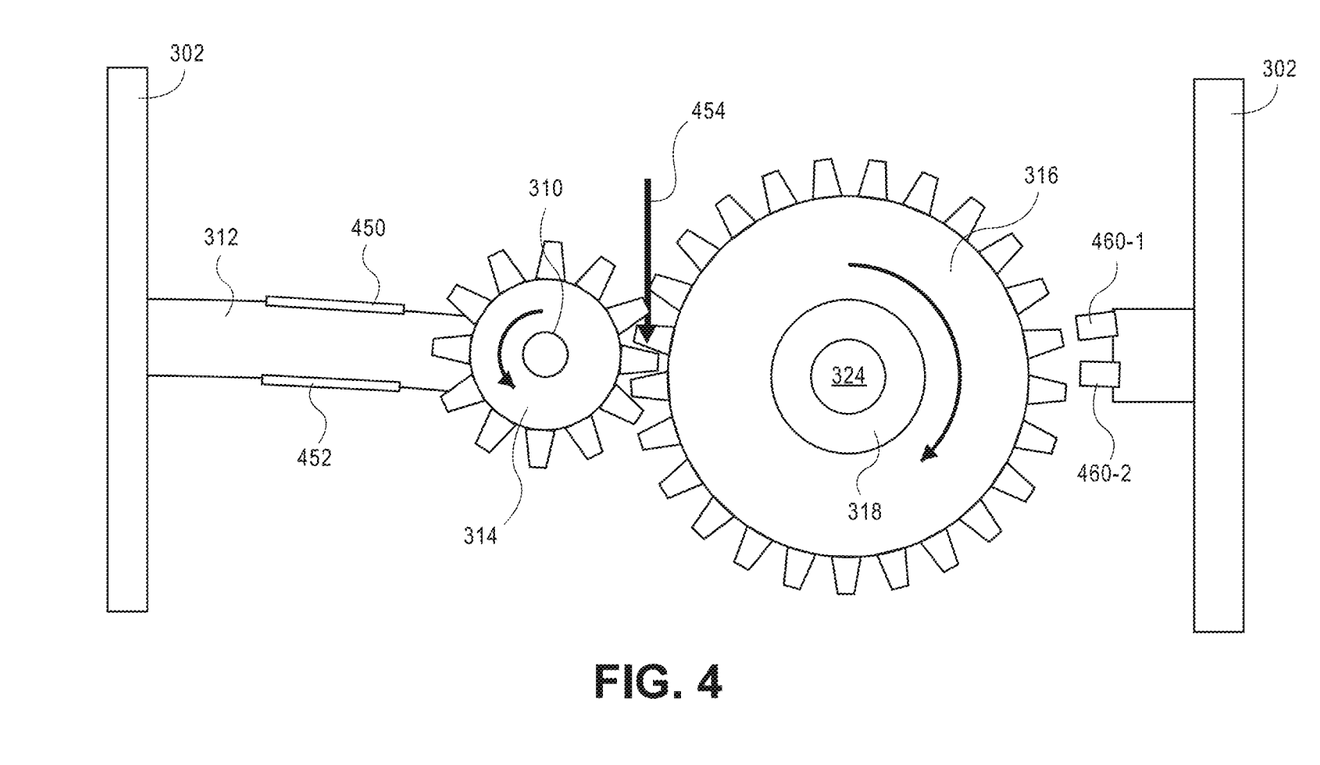
FIG. 4 illustrates a conceptual, top, schematic view of a gear drive of the top-drive system, according to an embodiment.

FIG. 4 illustrates a conceptual, schematic, top view of the top-drive system 300, specifically illustrating the engagement between the first and second gears 314, 316, according to an embodiment. With additional reference to FIG. 3, torque transmitted to the drill string 309 held by the top-drive system 300 may be measured by sensors 450, 452 attached onto the gear support arm 312 which is disposed within the frame, e.g., by measuring the bending forces on the support 312. For example, when the first gear 314 transmits torque from the motor shaft 310 to the second gear 316, a tangential force, indicated by arrow 454, is generated, and transmitted via the first gear 314 to the support 312 as a bending force. Accordingly, the sensors 450, 452 may be strain gauges, which may be configured to measure the bending of the support 312, from which the torque load may be calculated. In an embodiment, the strain gauges may be positioned on one or both sides of the support 312, as shown. Additionally or instead, the sensors 450, 452 may be provided as torque sensors, which may be disposed on either or both gears 314, 316 and/or shafts 310, 318. Further, in some embodiments, the torque may be measured according to a motor load, e.g., by measuring the current drawn by the motor 308 to rotate the drill string 309.

The top-drive system 300 may also measure vibration due to torque variation ("stick slip"). For example, the top-drive system 300 may include an accelerometer 408, which may be configured to measure the horizontal component of the vibration which also displaces the gear support 312. From this measurement, the time variation of torque may also be detected, yielding an indication of stick-slip conditions. The torque variation may also be obtained from the instantaneous measurement of the torque sensor 406 or sensors 450, 452.

Another measurement at the top-drive system 300 associated with the rotation of the drill string 309 may be the rotational speed. Accordingly, the system 300 may include a detector 460 that detects of the passage of the teeth of the second gear 316. In an embodiment, the detector 460 may include two sensors 460-1, 460-2, as shown in FIG. 4. The sensors 460-1, 460-2 may be or include magnetic (e.g., Hall-effect) sensors, induction sensors, optical sensors, or any other type of sensor that may recognize the rotation of the second gear 316 and/or the top-drive shaft 318. In some embodiments, the measurement may be based on the time between two successive pulses, e.g., as provided by the two sensors 460-1, 460-2; thus, for example, the sensors 460-1, 460-2 may be offset from one another by a distance that is unequal to the distance between corresponding points on adjacent teeth of the second gear 316. The direction of rotation may thus be obtained from the phase difference between two sensors 460-1, 460-2 at a slightly shifted angle versus the teeth. In some embodiments, the detectors 460-1 and 460-2 may detect the rotation of the teeth of any gear installed as reducer between the motor-driven shaft (310) and the shaft 318.

Referring again to FIG. 3, the top-drive system 300 may also measure its elevation from the rig floor, e.g., along the height of the mast on which it is supported. From the elevation of the top of the tubular above the rig floor, "measured depth" of the drill string 309 may be computed. For example, the torque reaction rollers 307, attached to the frame 302, roll on the mast rail. This allows the top-drive system 300 to resist the reaction torque opposed to the torque present in the drill string 309 hanging from the top-drive system 300. The rollers 307 roll on the rail and avoid sliding while the top-drive system 300 moves vertically in the mast. Sensors 412, 414, 416, 418 may measure the angular rotation of the rollers 307, allowing a determination of the movement (moved distance) of the top-drive system 300 versus the guidance rail. Encoders may be used as sensor 412, 414, 416, 418, for example. The wheels 307 may include marks which may affect the encoders in relation to the rotation of the wheels 307. The encoders may allow for detection of rotation and direction of rotation. Based on these measurements, the variation of the elevation of the top drive versus the rig floor may be determined, which allows for a determination of the variation of the position of the top of the drill string 309 supported by the top-drive system 300 versus the rig floor. Furthermore, a reference elevation may be employed in combination with the rotation measurement of the top-drive system 300. For example, an elevation reference may be determined manually, e.g., as the top-drive is moved to a pre-defined position in the mast, the corresponding elevation is entered into the computer.

In another example, the reference elevation may be determined automatically, e.g., as a sensor 420 passes one or more markers disposed at predetermined elevations in the mast, such that the rotation sensors 412, 414, 416, 418 may provide an indication of elevation movement above the most recent reference elevation marker. The marks may be located on the mast rails, but in some embodiments, may be elsewhere on the mast. The sensor 420 may be a magnetic-field detector, configured to detect the presence of local magnetic mark on the rail. The magnetic mark may be a physical magnet attached onto the rail. In another embodiment, the magnetic mark may be local magnetism imposed on the ferromagnetic steel of the rails.

The sensor 420 may also be an inductive sensor. A hole provided at the reference elevation in the metallic mast rail may be detected by such a sensor, to similar effect as the magnetic mark described above. Thus, sensor 420 may be a coil (or a pair of coils) which is (are) excited by AC signal (e.g., between about 10 kHz and about 60 kHz) resulting in a detectable change in induction when the sensor 420 encounters the presence of the hole.

The sensor 420 may also be an optical detector. Accordingly, the sensor 420 may include a light emitting diode and a light sensitive diode. These two diodes may be attached onto the top-drive system 300 in the proximity of the mast rail, e.g., on either side of the mast rail. As such, the detection may be based on transmission from one diode to the other one via a hole drilled through the mast rail. Thus, there may be light transmission when the top-drive system 300 encounters the aforementioned hole, positioned at the reference elevation. In still another embodiment, such optical detection may be based on reflection from one diode to the other one via a small reflector or optical prism attached to the mast rail. The reflection may change, and thus be detected, when the top-drive system 300 is at the elevation of the reflector/prism.

Furthermore, the use of such intermittent marks as providing reference elevation may mitigate the effects of roller 307 slippage, by effectively resetting the measurements from the rollers 307 at each mark. In an embodiment, the marks may be provided on the mast rails at a position corresponding to the top of the drill string 309 and at several elevations above the rig floor (e.g., (e.g., about 5 ft, about 33 ft, and about 60 ft in the case of a double-pipe stand). A constant offset may be included corresponding to the distance between the sensor 420 attached onto the top-drive system 300 and the attachment of the drill string 309 onto the top-drive system 300. With such marks, the computer may automatically update the elevation of the top of the tubular (drill string 309) versus the rig floor to the trigger elevations when the marks are detected. For example, one mark may be positioned near (e.g., slightly above) the lowest elevation before the rig is to stop lowering the drill string 309 toward the rig floor. Another mark may be positioned near (e.g., slightly below) the highest elevation before the rig is to stop lifting the drill string 309 before reaching the top of the mast. Optionally, another mark may be positioned between these two extremes, e.g., at mid "stroke." As the top-drive system 300 passes such point for the drill pipe stand that is being run into the wellbore, this mid-stroke mark may permit the computer to update (reset) the elevation reference for the roller elevation determination.

The recognition of individual marks may be performed, for example, using different marks at each elevation. In one embodiment, each "mark" may be a pair of marks, e.g., at the same elevation but shifted circumferentially. The sensor 420 may be a pair of sensors at the same vertical position, but also shifted versus the position of the mark. With such combination, the three elevations may be a binary pair according to sensor readings, e.g., the pair (11) or (01) or (10), with 1 and 0 being the output of the individual sensor.

Furthermore, the use of multiple rollers 307 and detectors 412, 414, 416, 418 may permit a statistical analysis using the multiple instantaneous measurements. This may allow some measurements to be rejected. Causes for such "bad" measurements may include non-rolling movement of the roller, inadequate contact with rail, sliding on rails, etc. In addition, the combination of the roller 307 rotation measurements and the detection of the marks on the mast rails may provide a continuous update of hook elevation with frequent and accurate reset of elevation reference.

The top-drive system 300 may also include a pressure gauge 422 positioned in the mud conduit 326. This gauge 422 may permit a calculation of the mean pumping pressure and the dynamic pressure. The mean pressure may represent the pressure at the entrance of the drill string 309, and, taken at the mud conduit 326, may not include hydraulic losses in the surface equipment. Based on the mean pressure, pressure loss in the wellbore may be estimated, which may be used to calibrate a hydraulic model.

The dynamic pressure measurement may be used for detecting mud-pulse telemetry signals. With the pressure gauge 422 installed at the top-drive system 300, the hose 332 may not be included in the travel of the mud-pulse signal. In an embodiment, the hose 332 may be more deformable than the drill string 309 and/or the mud conduit 326. Thus, the hose 332 may have different acoustic impedance than the drill string 309 and may, accordingly, act as a partial reflector. Furthermore, the hose 332 may act as an attenuator, since it is under pressure and its internal rubber dissipation characteristic may reduce the signal strength. With the pressure gauge 422 positioned between the drill string 309 and hose 332, the detected signal by the pressure gauge 422 may thus not be affected by such reflection and/or attenuation in the hose 332.

Further, noise generated by the pump that delivers mud through the mud hose 332 may also be at least partially avoided. As noted above, the hose 332 acts as a reflector and/or attenuator, which may result in an attenuation of the noise from the pump connected thereto. Thus, rather than experiencing attenuation in the signal pulse and noise from the pump, the pressure gauge 422 may experience attenuated noise and stronger signal pulses. As such, the signal-to-noise ratio may be improved for the pressure gauge 422 installed at the top-drive system 300 in comparison to a sensor installed closer to the triplex pumps at the other extremity of the mud hose 332. Furthermore, multiple pressure gauges 422 may be employed, and may be spaced apart by, for example, at least about one half of a wavelength of the mud-pulse telemetry signals, which may permit use of spatial filtering techniques.

The top-drive system 300 may also include one or more cable-thickness sensors 424, 426 installed on top of the frame 302 of the top-drive system 300. The sensors 424, 426 may measure a dimension (e.g., thickness) of the drilling line 306 as it passes by the sensors 424, 426. The drilling line 306, which may be made from a cable, may have a first, un-deformed shape, which may have a generally circular cross-section. When supporting the drill string 309, however, the load on the drilling line 306 may deform the shape (i.e., change the dimension) of the cable section being measured, resulting in the detection of a second, deformed shape of the drilling line 306. In particular, in this example, the sensor 426 may measure the drilling line 306 as it is in tension, but not in contact with the sheave 304, e.g., stretched by the load, such that the diameter of the drilling line 306 is reduced. The sensor 424 may measure the cable thickness where the drilling line 306 engages the sheave 304, where the drilling line 306 may experience deformation by flattening in addition to stretching.

During repeated operation, the drilling line 306 may be deformed by stretching and flattening. Such deformation may be noticeable at the locations corresponding to "slips transition" where the drill-string 309 goes in and out of slips. At the transition, there may be a sudden impulse in hook load, which may induce local deformation and damage in the drill line. When these local damages exceed a threshold, the drill line may be moved in the mast, so that "slip transitions" occurs using new drill line engaged onto the sheaves 304 (FIG. 3) of the travelling block and crown block.

Using the sensors 424, 426, however, the local deformation of drill-line cable 306 due to local stretch and flattening at the position corresponding to "slip transition" may be determined. When the threshold values of drill-line cable 306 deformation are reached, the drill-line cable 306 may be moved, e.g., slid, in the mast. This process may increase safety for the operation while minimizing time lost in the drill-line cable 306 change.

In various embodiments, the sensors 424, 426 may be ultrasonic pulse-echo sensors, a wear-resistant "brush" sliding against the cable associated with a displacement sensor (such as an LVDT), an inductance (eddy current) sensor to sense the distance from the sensor 424, 426 and the drilling line 306.

The top-drive system 300 may also include one or more sensors installed near, on, or in the motor 308 thereof, e.g., to monitor performance of the motor 308. Such sensors may include a temperature probe 428 to monitor a temperature of the motor 308 and/or an accelerometer 430 to monitor vibration generated by the motor rotor and its bearings. The recording of these measurements versus time may permit a determination of change in motor performance. The measurements may be combined with motor 308 load. The motor 308 load may be obtained from the torque and RPM measurements (described above) as well as voltage and current provided to the motor 308 via the power cable 311.

Figure 5:
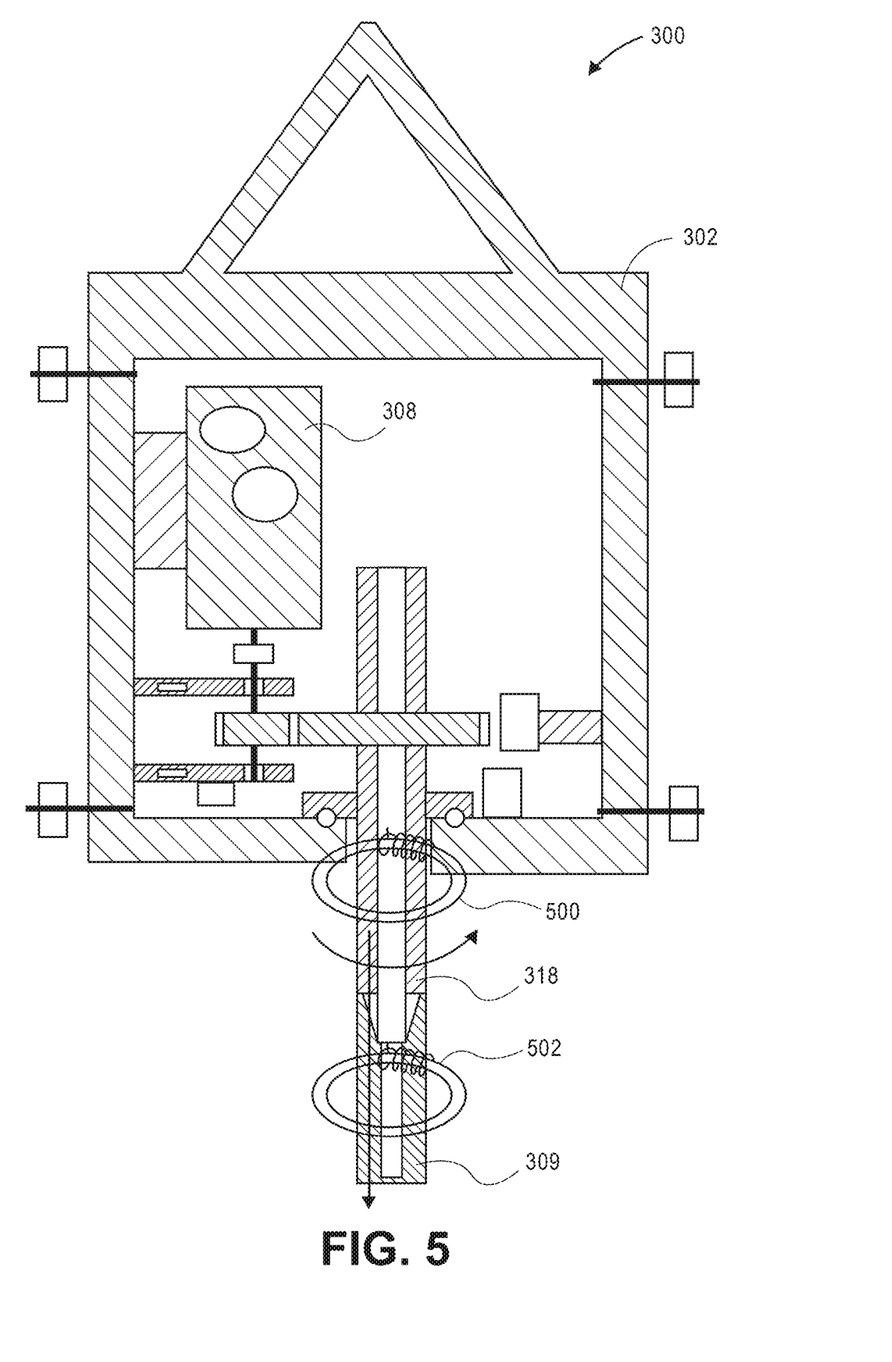
FIG. 5 illustrates another conceptual, side, schematic view of the top-drive system, according to an embodiment.

FIG. 5 illustrates another conceptual, side, schematic view of the top-drive system 300, according to an embodiment. In particular, FIG. 5 illustrates non-contact communication with an electrical system positioned at the top of the drill string 309. Such communication may be achieved using a rotary inductive coupling, rotary transformation, or an e-mag antenna. Such e-mag antenna may include a ferromagnetic core and a winding. When an AC current is injected in the winding, magnetism is created in the ferromagnetic core, a current in the tubular 318, 309 may be induced in the tubular 318. The return path of the current I may involve the first casing, drill-rig structure, mast, drill-line and top-drive frame. Furthermore, when an AC current I passes through an e-mag antenna, magnetism appears in the ferromagnetic core of the antenna: this create a AC voltage on the winding of the e-mag antenna. Accordingly, the antenna such antenna can be used as transmitter and receiver.

The communication system may include a first antenna 500 that is physically attached to the top-drive system 300, and a second antenna 502 that is physically attached to the drill string 309 or top-drive shaft 318. The two antennas 500, 502 may be spaced axially apart along the drill string 309 and/or the top-drive shaft 318. The rotating electrical system with second antenna 502 may be anywhere above the rig floor. Further, with gain adjustment, this second antenna 502 may pass below the rig floor and enter in the top of the cased well (or blow-out preventer (BOP)). In such application, the PLC 400 (FIG. 3) may be in communication with the first antenna 500, such that the PLC 400 acts as communication device between the top-drive and the rotary electrical system. The PLC 400 may then perform calculations and/or provide data to the rig control system, which may be remote from the top-drive system 300.

Figure 7:
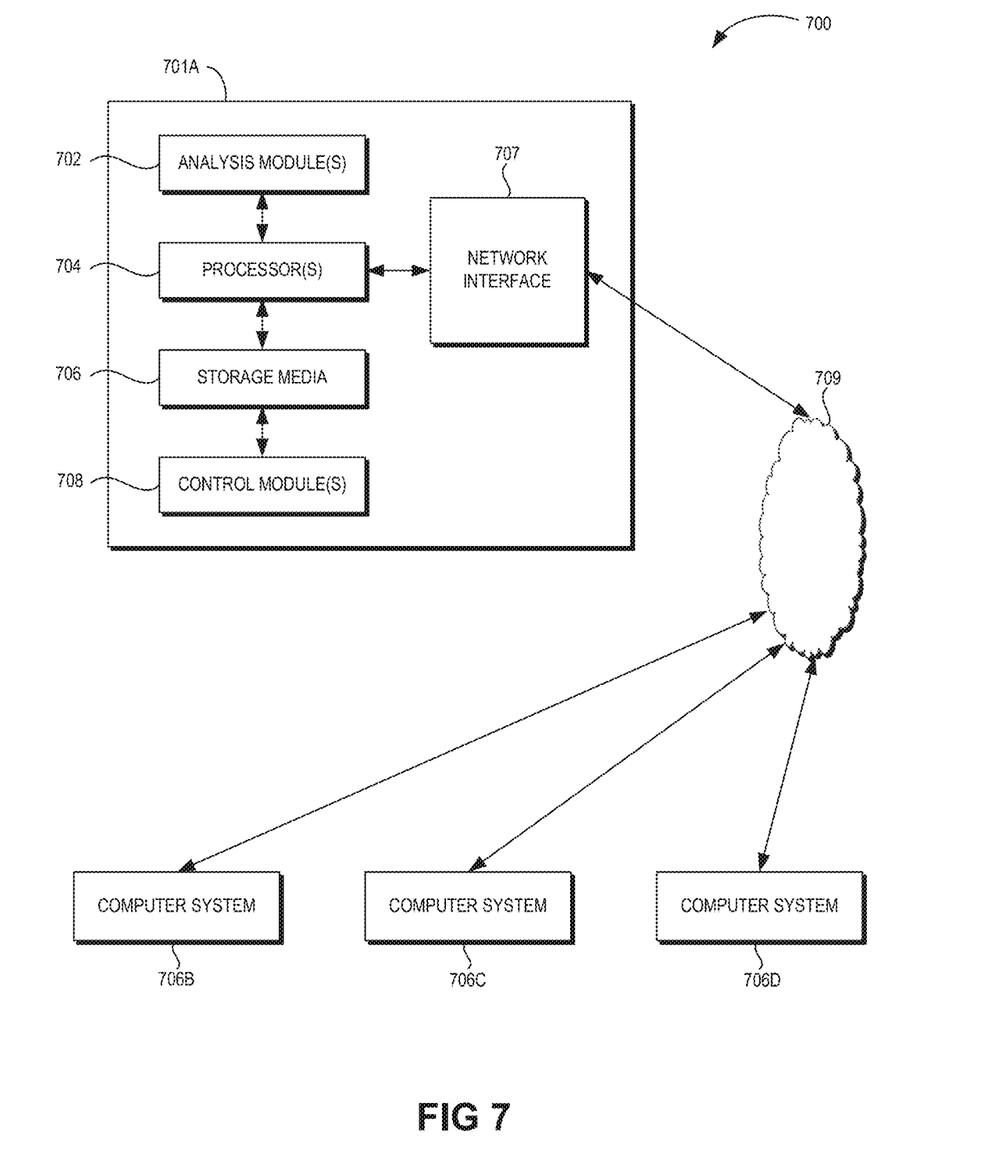
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 700 contains one or more rig control module(s) 708. In the example of computing system 700, computer system 701A includes the rig control module 708. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A top-drive system, comprising:
   a sheave configured to receive a drilling line;
   a frame coupled with the sheave and configured to transmit a weight of a tubular string suspended therefrom to the sheave;
   a controller;
   a sensor in communication with the controller, wherein the sensor comprises one or more of an optical sensor, a magnetic sensor, or an induction sensor and wherein the sensor is configured to measure one or more physical parameters of a drilling operation and provide data representing the one or more physical parameters to the controller; and
   one or more torque reaction rollers that roll along a rail of a mast, wherein the sensor measures a rotation of the one or more torque reaction rollers, and wherein the controller is configured to determine an elevation parameter based on the rotation measured by the sensor.

2. The system of claim 1, further comprising one or more second sensors configured to determine when the top-drive system reaches a mark representing a reference elevation in the mast, wherein the controller is configured to determine the elevation of the top-drive system above a rig floor by combining a measurement of the rotation of the one or more torque reaction rollers with a measurement based on the top-drive system reaching the mark, to generate an elevation of the top-drive system.

3. A top-drive system, comprising:
   a sheave configured to receive a drilling line;
   a frame coupled with the sheave and configured to transmit a weight of a tubular string suspended therefrom to the sheave;
   a controller; and
   a sensor in communication with the controller, wherein the sensor comprises one or more of an optical sensor, a magnetic sensor, or an induction sensor and wherein the sensor is configured to measure one or more physical parameters of a drilling operation and provide data representing the one or more physical parameters to the controller, wherein the sensor is configured to measure a dimension of the drilling line, and the controller is configured to calculate a deformation of the drilling line based on the dimension measured by the sensor.

4. A top-drive system, comprising:
   a sheave configured to receive a drilling line;
   a frame coupled with the sheave and configured to transmit a weight of a tubular string suspended therefrom to the sheave;
   a controller; and
   a sensor in communication with the controller, wherein the sensor comprises one or more of an optical sensor, a magnetic sensor, or an induction sensor and wherein the sensor is configured to measure one or more physical parameters of a drilling operation and provide data representing the one or more physical parameters to the controller
   a mud conduit having an upstream side and a downstream side, the mud conduit fluidly coupled with the tubular string on the downstream side; and
   a mud hose through which a mud flow is received on the upstream side, wherein the sensor comprises a pressure gauge positioned at least partially in the mud conduit, so as to measure a mean pressure, a dynamic pressure, or both of a fluid in the mud conduit.

5. The system of claim 4, further comprising one or more additional pressure gauges configured to determine a pressure of the fluid therein, to allow for spatial filtering.

6. A drilling rig, comprising:
   a rig control system configured to calculate drilling parameters; and
   a top drive configured to be controlled by the rig control system according to the drilling parameters, the top drive comprising:
   a sheave configured to receive a drilling line;
   a frame coupled with the sheave and configured to transmit a weight of a tubular string suspended therefrom to the sheave;
   a controller disposed in communication with the rig control system;
   a sensor in communication with the controller, wherein the sensor is configured to measure one or more physical parameters of a drilling operation, and wherein the sensor is configured to measure a dimension of the drilling line, and provide data representing the one or more physical parameters to the controller;
   one or more torque reaction rollers that roll along a rail of a mast, wherein the sensor measures a rotation of the one or more torque reaction rollers; and
   one or more second sensors configured to determine when the top drive reaches a mark representing a reference elevation in the mast, wherein the controller, or the rig control system, or both are configured to combine a measurement of the rotation of the one or more torque reaction rollers with a measurement based on the top drive reaching the mark, to generate an elevation of the top drive.

7. A drilling rig, comprising:
   a rig control system configured to calculate drilling parameters; and
   a top drive configured to be controlled by the rig control system according to the drilling parameters, the top drive comprising:
   a sheave configured to receive a drilling line;
   a frame coupled with the sheave and configured to transmit a weight of a tubular string suspended therefrom to the sheave;
   a controller disposed in communication with the rig control system; and
   a sensor in communication with the controller, wherein the sensor is configured to measure one or more physical parameters of a drilling operation, and wherein the sensor is configured to measure a dimension of the drilling line, and provide data representing the one or more physical parameters to the controller, wherein the controller, or the rig control system, or both are configured to adjust an elevation calculation for the top drive based on the dimension.

8. The drilling rig of claim 7, wherein the sensor is positioned to measure a dimension of drilling line that is not in contact with the sheave, the top drive further comprising a second sensor configured to measure a dimension of the drilling line where it is in contact with the sheave.

\* \* \* \* \*